Nov. 5, 1940.　　　　J. L. BIBLE ET AL　　　　2,220,199
CLAMPING DEVICE FOR FORCE RESPONSIVE ELEMENT
Filed Dec. 27, 1938　　　　3 Sheets-Sheet 3
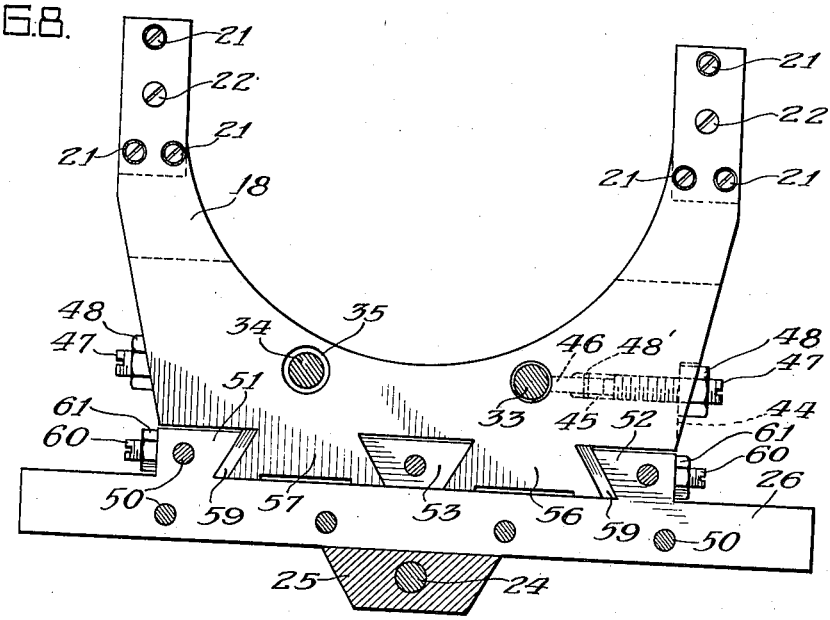
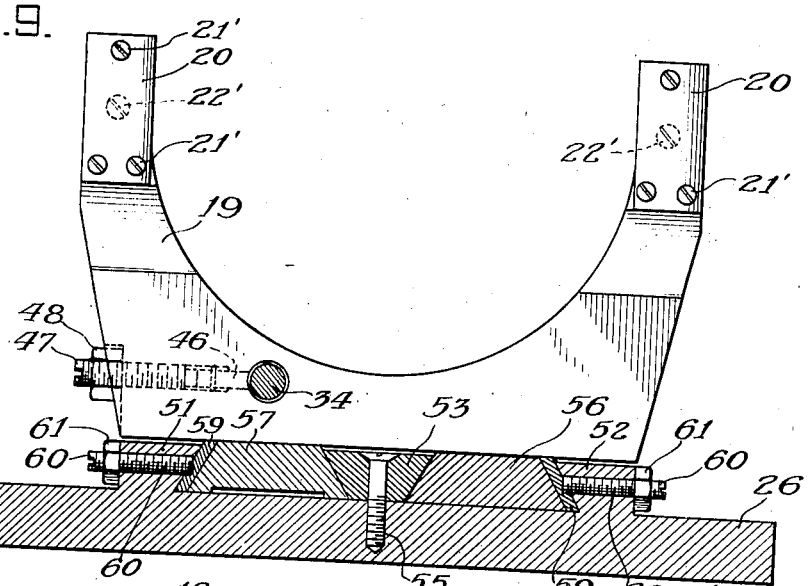
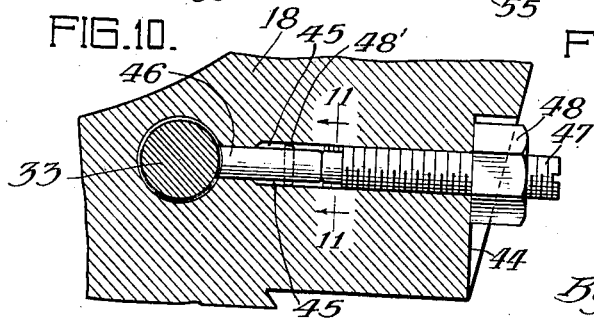
Inventors:
John L. Bible
Robert H. Ray
By Geo. L. Parkhurst
Attorney Patented Nov. 5, 1940

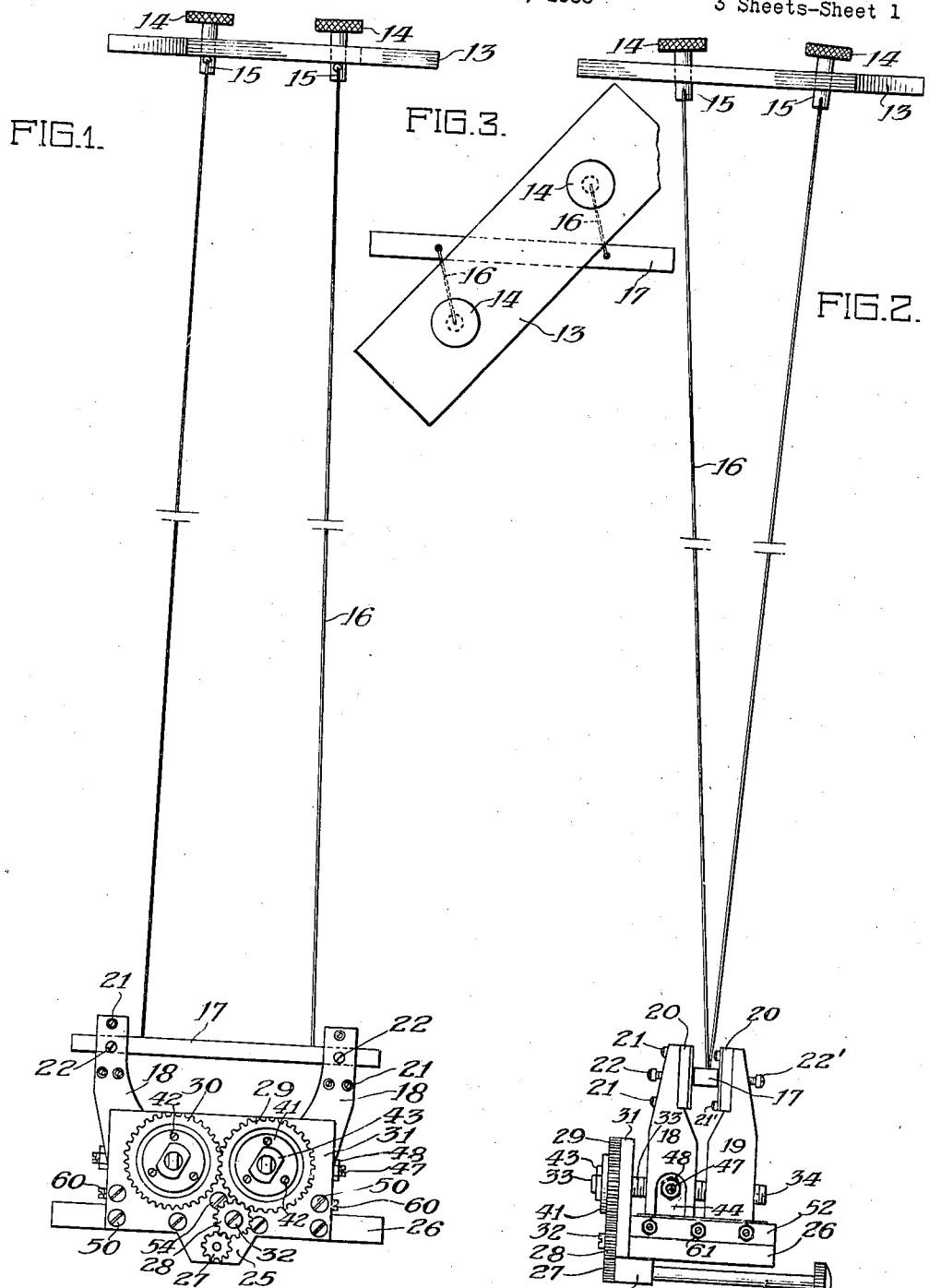

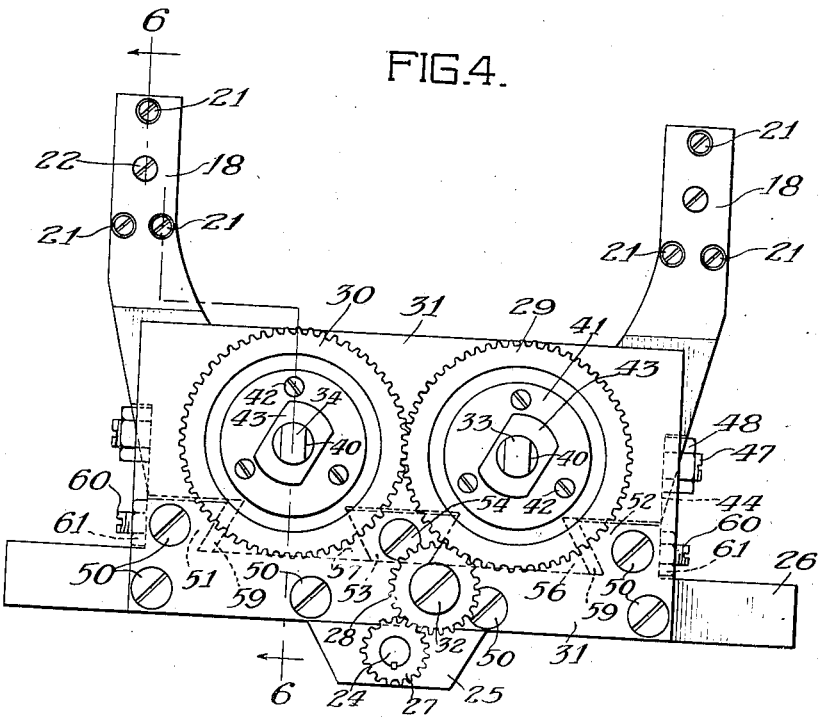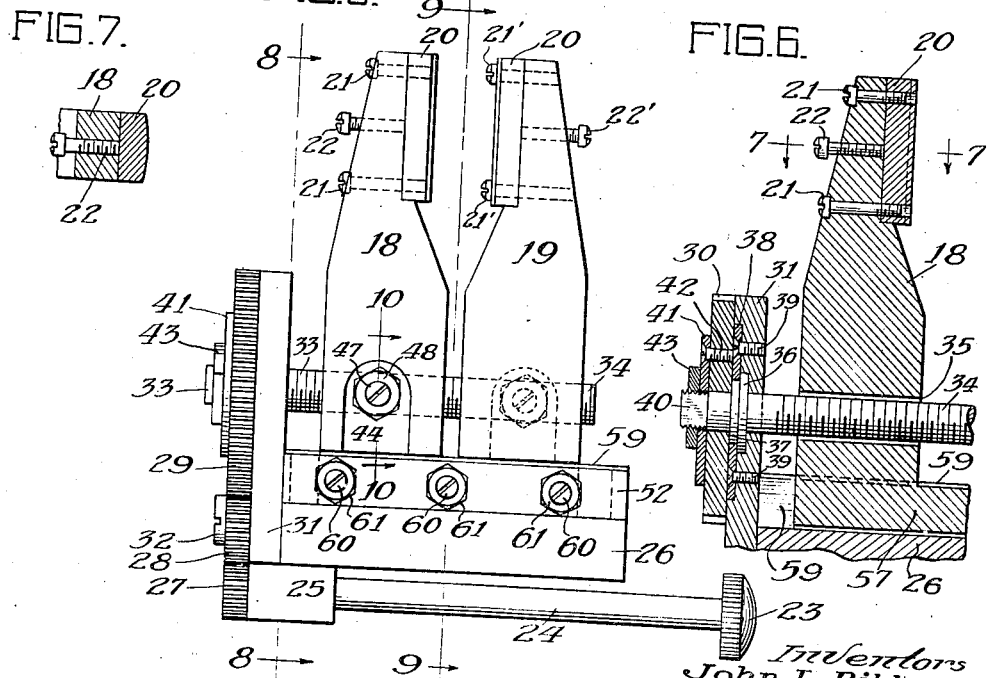

2,220,199

UNITED STATES PATENT OFFICE 2,220,199

CLAMPING DEVICE FOR FORCE RESPONSIVE ELEMENT

John L. Bible, Tulsa, Okla., and Robert H. Ray, Houston, Tex., assignors to Stanolind Oil and Gas Company, Tulsa, Okla., a corporation of Delaware Application December 27, 1938, Serial No. 247,790

5 Claims. (Cl. 265—1.4)

This invention relates to a clamping device for a force responsive element and more particularly to a gravity meter clamping and damping device.

In various geophysical and other instruments involving an elastically suspended force responsive element a serious problem exists in properly clamping and damping the force responsive element. Thus the instrument should be clamped so that it can be carried from place to place with ease and without injury and it should be damped so that a reading can be obtained in a reasonable time. Further we find that it is very important to have the clamping so accomplished as to avoid stretching the elastic suspension and also to avoid unfortunate hysteresis effects. In other words the gravity meter weight or other force responsive element should be clamped without displacing it from its equilibrium or rest position.

The solution of the problem set forth in the preceding paragraph are objects of our invention. Another object of our invention is to provide a single device which in one position will act as a clamping device and in another position act as a damping device. A further object of our invention is to provide a clamping device or a combination clamping and damping device which is readily adjustable and rapid in operation. Other and more detailed objects, advantages and uses of our invention will become apparent as the description thereof proceeds.

While our invention is applicable to other types of sensitive force measuring instruments, it has been particularly designed for use in connection with gravity meters and especially for use in connection with the Hart Brown gravity meter described in U. S. Patent No. 2,125,282. A specific embodiment of our invention as applied to the Hart Brown gravity meter is shown in the accompanying drawings in which:

Figure 1 is a front elevation of our device showing its application to the main elements of a gravity meter of the Hart Brown type;

Figure 2 is an end elevation corresponding to Figure 1;

Figure 3 is a partial plan view corresponding to Figures 1 and 2;

Figure 4 is a more detailed front elevation of the clamping and damping device as shown in Figure 1;

Figure 5 is a more detailed end elevation of the clamping and damping device as shown in Figure 2;

Figure 6 is a partial sectional elevation taken along the line 6—6 of Figure 4;

Figure 7 is a sectional plan view of a detail taken along the line 7—7 of Figure 6;

Figure 8 is a sectional elevation taken along the line 8—8 of Figure 5;

Figure 9 is a sectional elevation taken along the line 9—9 of Figure 5;

Figure 10 is a sectional elevation of a detail taken along the line 10—10 of Figure 5; and Figure 11 is a sectional elevation taken along the line 11—11 of Figure 10.

Turning now to Figures 1, 2 and 3 a gravity meter of the type shown includes a top member 13, supporting knurled screws 14 which carry clips 15 to which are attached the very fine torsion strands 16. It is important that these clips be in line with the wires to avoid introducing bending stresses at the points of juncture. The torsion strands support a bar 17 which is the gravity responsive element. The top member, screws, clips and bar are shown in simplified diagrammatic fashion since they constitute no part of the present invention except insofar as the clamping and damping device cooperates with them. Further the complete gravity meter includes many other features such as the case, thermostat and angle measuring apparatus which likewise constitute no part of the present invention.

Knurled screws 14 are rotated until the bar 17 assumes the position shown in Figure 3. The force required to lift the bar from its lowermost position is balanced by the torsion in strands 16. Changes in the force of gravity then cause changes in the position of bar 17 which in the instrument we have designed rotates under the range of gravity constants met with in practice through a range of about six seconds of arc. These extremely small angular displacements are amplified by an optical lever and permit measurement of the force of gravity to within one part in ten million.

In order to obtain a practical instrument of this precision we find it imperative to have a highly efficient clamping device or still better a combination clamping and damping device. Moreover, the clamping should not introduce additional stresses, either tensional or torsional in the suspension strands. Thus the bar should be clamped from the sides rather than from top and bottom or in other words the clamping faces should move substantially at right angles to the suspension. Further to avoid extraneous torsional stresses two clamping faces should preferably move in from opposite sides to clamp the bar without changing its angular position although one stationary and one movable face can be used.

The combination clamping and damping device is shown at the bottom of Figures 1 and 2 and in more detail in Figures 4 and 5.

Front clamping yoke 18 and back clamping yoke 19 each carry two clamping faces 20. The front clamping faces and each side of the front clamping yoke are tapped for 3 tap screws 21 arranged in triangular formation as best seen in Figures 1, 4 and 8. Each side of the front clamping yoke is likewise tapped to receive tap screw 22 which bears against the clamping face and acts to hold the clamping face very slightly out of contact with the clamping yoke so that the position of the clamping face can be adjusted as a whole by adjusting screw 22 and its attitude can then be delicately adjusted by means of adjusting screws 21.

Somewhat similarly, the back clamping faces 20 are adjusted by tap screws 21' and 22' except that tap screws 21' have their heads on the front instead of the back of the device since, as designed, the front of the instrument is more accessible than the back so that the back clamping faces are best adjusted from the front when the front clamping yoke is off.

The clamping faces are curved as shown in Figure 7 so as to give line contact on clamping and improved damping action. Accordingly the back clamping faces are countersunk to give good bearing faces for the heads of screws 21'.

When the device is in use the front and back clamping yokes and their clamping faces move towards each other or away from each other in response to rotation of knurled knob 23 (Figures 2 and 5) which projects through the rear of the instrument case (not shown). This knob is attached to rod 24 which projects through a downward and forward extension 25 of clamping base 26. Rod 24 carries gear 27 which meshes with gear 28 which meshes in turn with gear 29 and the latter in its turn meshes with gear 30. Gears 28, 29 and 30 are carried by gear plate 31. Bearing screw 32 acts as a bearing for gear 28.

Gear 29 is attached to threaded shaft 33 which controls the motion of front yoke 18, while gear 30 is attached to threaded shaft 34 which controls the motion of back yoke 19. Since the gears necessarily rotate in opposite directions the yokes necessarily move in opposite directions. Threaded shaft 33 ends to about the mid-point between the two yokes while threaded shaft 34 projects through a hole 35 (Figures 6 and 8) in the front yoke and then projects beyond the back yoke, the motion of which it controls.

The attachment of gear 29 to shaft 33 and its journalling in gear plate 31 are accomplished, as best seen in Figure 6, by countersinking the gear plate to receive a circular projection 36 on shaft 33. This shaft also carries a smaller circular projection 37 forward of projection 36 and this projection 37 cooperates with a similar circular opening in retainer 38. The retainer is attached by countersunk cap screws 39 to gear plate 31. Forward of projection 37 is non-circular projection 40 which cooperates with a similar opening in coupling plate 41 which is in turn attached to gear 29 by countersunk cap screws 42. Nut 43 completes this part of the structure.

Gear 30 is, of course, connected with threaded shaft 34 and the latter is journalled in gear plate 31 in a manner identical with that described for gear 29 and threaded shaft 33.

Turning now to the parts controlling the interaction of the threaded shaft 33 and 34 with the front and back yokes 18 and 19 respectively, we see in Figures 8 and 9 that shaft 33 cooperates with the front yoke on the right side while shaft 34 cooperates with the back yoke on the left side. In both cases structure is provided to control the friction between the shafts and yokes. This structure is best seen in Figures 10 and 11 and the description will be confined to the front yoke.

Front yoke 18 is recessed to provide vertical surface 44. Two small holes 45 are then drilled as best seen in Figure 11. These holes extend to the depth seen in Figure 10. A larger hole is then drilled midway between the small ones to receive plug 46. The diameter of this larger hole is about the distance between the centers of the two small holes. These holes are drilled before the yoke is tapped to receive threaded shaft 33 and the hole to receive plug 46 is drilled well into the position ultimately occupied by the threaded shaft. Yoke 18 is then tapped to a depth less than that of holes 45 concentrically with the hole for plug 46 in order to provide threads for screw 47. Plug 46 is equipped with a projecting pin 48' with rounded ends. Plug 46, screw 47 and nut 48 are installed and the yoke is then tapped to receive threaded shaft 33. The end of the plug is, of course, simultaneously threaded and the friction between the threaded shaft and the threads on the yoke and plug can thus be adjusted by means of screw 47 and nut 48.

Gear plate 31 is attached to clamping base 26 by means of six countersunk cap screws 50. This clamping base is equipped with two dovetail projections 51 and 52 as best seen in Figures 8 and 9. A center dovetail 53 (Figures 8 and 9) is attached to gear plate 31 by countersunk cap screw 54 and to clamping base 26 by four countersunk cap screws 55 of which one is shown in Figure 9.

Front yoke 18 has a dovetail projection 56 (Figures 8 and 9) extending substantially the full depth of clamping base 26 as seen in Figure 5. The back yoke has a similar dovetail projection 57. These dovetail projections are held in adjustably tight sliding engagement with center dovetail 53 by means of two jibs 59; one disposed between dovetail projections 51 and 57 and the other between dovetail projections 52 and 56. These jibs are adjusted by screws 60 which cooperate with tapped holes passing through clamping base projections 51 and 52. Locknuts 61 preserve the adjustment thus made.

Thus we have provided a device which will clamp a gravity meter weight or other force responsive element without moving it from its equilibrium position and which when unclamped slightly will give a smooth damping action due to fluid friction caused by relative motion between the force responsive element and the clamping and damping faces.

While we have described our invention in connection with a specific embodiment thereof, it is to be understood that this is by way of illustration and not by way of limitation and we do not mean to be restricted thereto but only to the scope of the appended claims which should be construed as broadly as the prior art will permit.

We claim:

1. A clamping device for a gravity meter of the type in which an elongated mass is suspended by spaced filaments and swings through a very small arc which comprises a base, two movable members, one disposed on either side of said mass, means associated with said base for supporting said two movable members, means for driving said two movable members, and a plurality of spaced clamping members mounted on each of said movable members on opposite sides of and adjacent to said mass, said driving means and said movable members being constructed and arranged to cause said clamping members to move simultaneously and only in opposite directions.

2. A clamping and damping device for a gravity meter of the type in which a bar is suspended by filaments and swings through an exceedingly small arc; which comprises a base, two yokes, one disposed on either side of said bar, guides associated with said base and with said yokes, two yoke driving members, one associated with each of said yokes, common means for driving said two yoke driving members, said yoke driving members and said common means being constructed and arranged to cause said yokes to move in opposite directions between a clamping position and a damping position, and two pairs of clamping and damping faces, one pair carried by each of said yokes, said clamping and damping faces being disposed on said yokes in such manner that one of said faces is disposed opposite each end of said bar on each side of said bar.

3. A device according to claim 2 including separate means associated with each of said clamping and damping faces for adjusting the positions and attitudes of said clamping and damping faces.

4. A device according to claim 2 including means associated with each of said faces for adjusting the positions and attitudes of said faces.

5. A clamping and damping device for a gravity meter of the type in which a bar is suspended by filaments and swings through an exceedingly small arc; which comprises a base, two yokes, one disposed on either side of said bar, guides associated with said base and with said yokes, two yoke driving shafts, one associated with each of said yokes, a gear train for driving both of said shafts, means for driving said gear train, said yokes, said shafts and said gear train being constructed and arranged to cause said yokes to move in opposite directions between a clamping position and a damping position, and two pairs of clamping and damping faces, one pair carried by each of said yokes, said clamping and damping faces being disposed on said yokes in such manner that one of said faces is disposed opposite each end of said bar on each side of said bar.

JOHN L. BIBLE.
ROBERT H. RAY.